(12) United States Patent
Ulbrich et al.

(10) Patent No.: US 9,915,317 B2
(45) Date of Patent: Mar. 13, 2018

(54) CENTRIFUGAL PENDULUM

(71) Applicant: Bayerische Motoren Werke Aktiengesellschaft, Munich (DE)

(72) Inventors: Heinz Ulbrich, Munich (DE); Johannes Mayet, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/631,967

(22) Filed: Feb. 26, 2015

(65) Prior Publication Data

US 2015/0167779 A1    Jun. 18, 2015

Related U.S. Application Data

(63) Continuation of application No. PCT/EP2013/067455, filed on Aug. 22, 2013.

(30) Foreign Application Priority Data

Aug. 27, 2012 (DE) .................... 10 2012 016 924

(51) Int. Cl.
F16F 15/14 (2006.01)
F16F 15/31 (2006.01)

(52) U.S. Cl.
CPC ........ F16F 15/1471 (2013.01); F16F 15/145 (2013.01); F16F 15/31 (2013.01); *Y10T 74/2128* (2015.01)

(58) Field of Classification Search
CPC ............... F16F 15/145; F16F 15/13128; F16F 15/1471; F16F 15/31

(Continued)

(56) References Cited

U.S. PATENT DOCUMENTS 1,641,230 A * 9/1927 Manville ............. F16F 15/1442
464/3
1,982,394 A * 11/1934 Morris .................. F16H 37/124
192/139

(Continued)

FOREIGN PATENT DOCUMENTS

CN    1955502 A    5/2007
CN    102245928 A    11/2011

(Continued)

OTHER PUBLICATIONS

Chinese Office Action issued in corresponding Chinese Application No. 201380037520.3 dated Aug. 5, 2015 with English translation (15 pages).

(Continued)

*Primary Examiner* — Vicky A Johnson
(74) *Attorney, Agent, or Firm* — Crowell & Moring LLP

(57) ABSTRACT

A centrifugal pendulum, in particular for arrangement on a drive shaft of an internal combustion engine, has a drive ring which can be mounted on a drive shaft for rotation therewith, and a synchronizing ring which is freely rotatable relative to the drive ring. The axis of rotation of the drive ring and the axis of rotation of the synchronizing ring are identical. The centrifugal pendulum further includes at least one pendulum body which is mounted movably on the drive ring. The pendulum body is kinematically coupled via at least one coupling element to the synchronizing ring such that, in the event of a rotation of the synchronizing ring relative to the drive ring in a first direction, the coupling element deflects the pendulum body toward the axis of rotation.

12 Claims, 4 Drawing Sheets

(58) Field of Classification Search
USPC .......................................................... 74/574.2
See application file for complete search history.

(56) References Cited

U.S. PATENT DOCUMENTS

| | | | |
|---|---|---|---|
| 2,079,226 A | | 5/1937 | Sarazin |
| 2,378,592 A | * | 6/1945 | Specht .................... F16F 15/14 |
| | | | 74/604 |
| 2,387,776 A | * | 10/1945 | Salomon ............... F16F 15/145 |
| | | | 74/574.2 |

FOREIGN PATENT DOCUMENTS

| | | | | |
|---|---|---|---|---|
| DE | 103 31 391 A1 | | 2/2005 | |
| DE | 102010034812 A1 | * | 3/2011 | ............ F16F 15/145 |
| DE | 10 2010 052 389 A1 | | 6/2011 | |
| DE | 102010054297 A1 | * | 6/2011 | ........ F16F 15/13157 |
| WO | WO 2011147632 A2 | * | 12/2011 | ............ F16F 15/145 |

OTHER PUBLICATIONS

Chinese Office Action issued in counterpart Chinese Application No. 201380037520.3 dated Mar. 14, 2016 with English translation (11 pages).
International Search Report (PCT/ISA/210) dated Dec. 6, 2013, with English translation (six (6) pages).
German-language Written Opinion (PCT/ISA/237) dated Dec. 6, 2013 (six (6) pages).

\* cited by examiner

CENTRIFUGAL PENDULUM

CROSS REFERENCE TO RELATED APPLICATIONS

This application is a continuation of PCT International Application No. PCT/EP2013/067455, filed Aug. 22, 2013, which claims priority under 35 U.S.C. § 119 from German Patent Application No. 10 2012 016 924.8, filed Aug. 27, 2012, the entire disclosures of which are herein expressly incorporated by reference.

BACKGROUND AND SUMMARY OF THE INVENTION

The invention relates to a centrifugal pendulum and, in particular, to a centrifugal pendulum for arrangement on a drive shaft of an internal combustion engine.

In the case of four-stroke reciprocating piston engines, the periodic sequence of the four strokes (induction, compression, operation, discharge) in combination with the ignition sequence of the individual cylinders leads to rotational irregularities of the crankshaft and of the connected flywheel. Since a drive train, because of the inertial forces and rigidities inherent thereto, is a structure which is capable of torsional vibration and has characteristic resonant frequencies, the rotational irregularities introduced by the engine inevitably lead to torsional vibrations. The latter have to be reduced structurally.

The trend is toward engines having a smaller number of cylinders. Also, engine developers are focused on reducing the rotational speed level. However, this leads to a greater rotational irregularity which, in turn, necessitates novel damping concepts.

Known devices for reducing torsional vibrations in the event of fluctuating torque loadings exist in different forms depending on the sector (motor vehicle technology, shipping technology, aviation technology, machine tools, etc.). Examples of devices established in motor vehicle technology for reducing torsional vibrations include single and dual mass flywheels and, more recently, also centrifugal pendulums, as well as combinations of the respective devices. However, the known devices can only inadequately meet modern industrial requirements (for example, quiet running) under high and/or low-frequency torque loadings.

In the dynamic design of devices for reducing torsional vibrations in the event of fluctuating torque loadings, steady operating states, in particular the operating of a machine tool (under load) at a virtually constant rotational speed, have to be taken into consideration just as much as unsteady operating states, in particular the accelerating or decelerating of a machine tool (under load). With regard to steady operating states, known centrifugal pendulum devices have the disadvantage that the effect is sensitive to bearing friction, is limited by a restricted angle of amplitude of the pendulum swing and is subject to restrictive geometric proportions. With regard to unsteady operating states, known centrifugal pendulum devices have the disadvantage that the maximum angles of amplitude are limited by additional measures in the case of a low-friction or low-damping design. Measures which permit an impact-free deceleration of the pendulum masses are desirable from an acoustic aspect. Established centrifugal pendulum systems meet this only inadequately.

It is the object of the invention to better meet the modern industrial requirements for the reduction of torsional vibrations in the event of fluctuating torque loadings. In particular, the intention is to better manage vibration problems at low rotational speeds.

This and other objects are achieved by a centrifugal pendulum according to the present invention.

According to a first aspect of the invention, the centrifugal pendulum is provided in particular for arrangement on a drive shaft of an internal combustion engine and comprises a drive ring, a synchronizing ring and at least one pendulum body mounted on the drive ring. The centrifugal pendulum is distinguished in that a purely rotary movement of the synchronizing ring and a purely rotary movement of the pendulum body occur relative to the bearing points on the drive ring.

According to a second aspect of the invention, the centrifugal pendulum is provided in particular for arrangement on a drive shaft of an internal combustion engine and comprises a drive ring which can be mounted on a drive shaft for rotation therewith, and a synchronizing ring which is freely rotatable relative to the drive ring. The axis of rotation of the drive ring and the axis of rotation of the synchronizing ring are identical. The centrifugal pendulum furthermore comprises at least one pendulum body which is mounted movably on the drive ring. The pendulum body is kinematically coupled via at least one coupling element to the synchronizing ring in such a manner that, in the event of a rotation of the synchronizing ring relative to the drive ring in a first direction, the coupling element deflects the center of gravity of the pendulum body toward the axis of rotation.

The centrifugal pendulum according to the invention is based on a different principle than systems known to date. The relative rotation of the driven drive ring with respect to the synchronizing ring, which is freely rotatable per se, leads to a deflection of the center of gravity of the pendulum body inward, which deflection, however, can be (over)compensated for again by the centrifugal force. If a plurality of pendulum bodies are coupled to the synchronizing ring, it merely has to be ensured that the resulting overall center of gravity of the pendulum bodies can be deflected inward by the relative rotation and outward again by the centrifugal force. This principle permits an extremely effective and stable damping of torsional vibrations, in particular at low rotational speeds. The synchronizing ring here provides an additional inert mass, as a result of which the overall inertia is shifted. If a plurality of pendulum bodies are provided, the synchronizing ring also ensures a synchronous, uniform movement of all of the pendulum bodies.

The invention can be used in multiple sectors for compensating for fluctuating torsional moments. The size ratios can be scaled in accordance with the maximum torsional moment peaks (for example increase/reduction of the distance of pendulum body center of mass from the axis of rotation and/or increase/reduction of the pendulum body masses). The centrifugal pendulum according to the invention can be used as a supporting additional measure for vibration-decoupling or vibration-damping systems. In particular, a mounting on the secondary side of a dual mass flywheel is possible. In general, the centrifugal pendulum can be readily integrated in vibration-decoupling or vibration-damping systems.

In order to ensure a substantially uniform vibration of the pendulum body, the intention is that, in the event of a centrifugally induced deflection of the pendulum body away from the axis of rotation, the coupling element will rotate the synchronizing ring relative to the drive ring in a direction opposed to the first direction (=the preceding direction of rotation which has led to the deflection of the pendulum body inward).

In principle, the pendulum body can be mounted movably in different ways on the drive body. According to a first group of preferred embodiments, the pendulum body is mounted rotatably on the drive ring, the coupling element only permitting a limited rotation of the pendulum body. In this case, the pendulum body executes controlled torsional vibrations.

The coupling element used can be a rolling body, in particular a bolt, which is placed in a freely movable manner in spatially limited contours of the synchronizing ring and of the pendulum body. The interaction of the contours and of the rolling body which can roll on the contours permits (any) non-linear kinematics between the pendulum bodies and the synchronizing ring when the drive ring and the synchronizing ring rotate relative to each other. A tautochrone coordination of the centrifugal pendulum can be achieved by the shaping of the contours.

According to a first preferred construction of the centrifugal pendulum according to the invention, the pendulum body lies between two rigidly interconnected disks of the synchronizing ring. The coupling element extends from a contour of the first disk through a contour of the pendulum body into one of the contours of the second disk, said contour lying exactly opposite the contour of the first disk.

According to an alternative, second preferred construction, the synchronizing ring lies between two rigidly interconnected halves of the pendulum body. The coupling element extends from a contour of the first pendulum body half through a contour of the synchronizing ring into one of the contours of the second pendulum body half, said contour lying exactly opposite the contour of the first pendulum body half A linear mounting of the pendulum body on the drive ring, in which the pendulum body is displaceable in a translatory manner, preferably in the radial direction, also permits advantageous configurations of the centrifugal pendulum according to the invention.

As an example of this second group of preferred embodiments, the coupling element provided can be a thread or a band with which the pendulum body is connected to the synchronizing ring. Preferred kinematics can be achieved in particular by the synchronizing ring having an outer circumference with a contour (to be configured according to requirements) against which the thread or the band nestles during a relative rotation between drive ring and synchronizing ring.

An articulation mechanism via which the pendulum body is connected to the synchronizing ring can also serve as the coupling element.

In a further configuration, the pendulum body is coupled to an outer section of the synchronizing ring by the pendulum body being hooked into a roller which can roll on a contour of the synchronizing ring.

Similarly to the case of a rotatable mounting, use of a rolling body as the coupling element, in particular a bolt, can also be made in the case of a linear mounting of the pendulum body. The bolt is placed in a freely movable manner in contours of the synchronizing ring and of the pendulum body.

Although for the basic functioning of the centrifugal pendulum according to the invention only one pendulum body is required, greater damping actions with a smaller unbalance can be achieved with a plurality of pendulum bodies which are mounted on the drive ring in a manner distributed in the circumferential direction. In the event of a rotation of the synchronizing ring relative to the drive ring in the first direction, the overall center of mass of all of the pendulum bodies has to be deflected toward the axis of rotation.

An elastic element can optionally (in each case) be provided for the coupling of the drive ring to the drive shaft and/or for a coupling of the drive ring to the synchronizing ring and/or for the mounting of the pendulum body on the drive ring.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
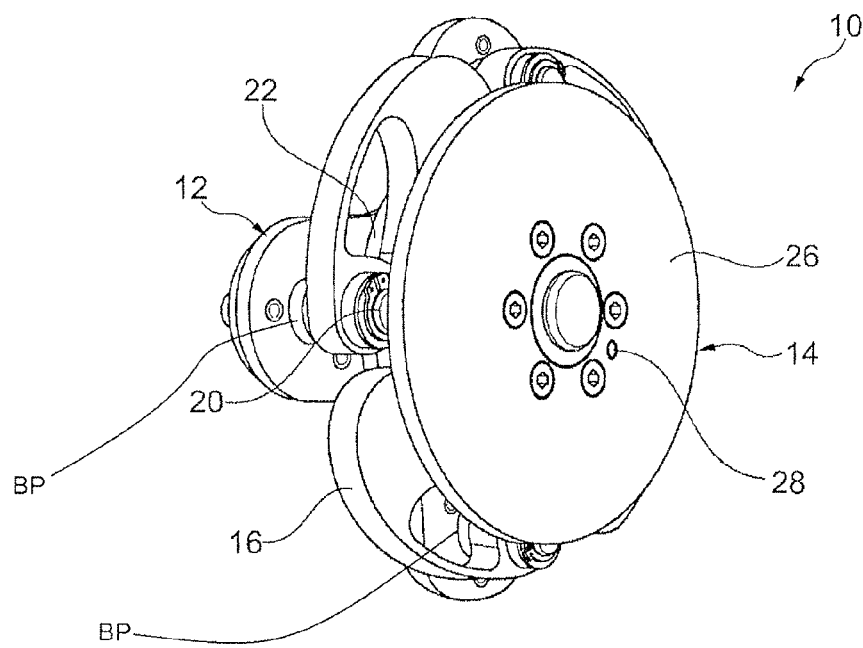
FIG. 1 is a perspective view of a first embodiment of a centrifugal pendulum according to the invention.
Figure 2:
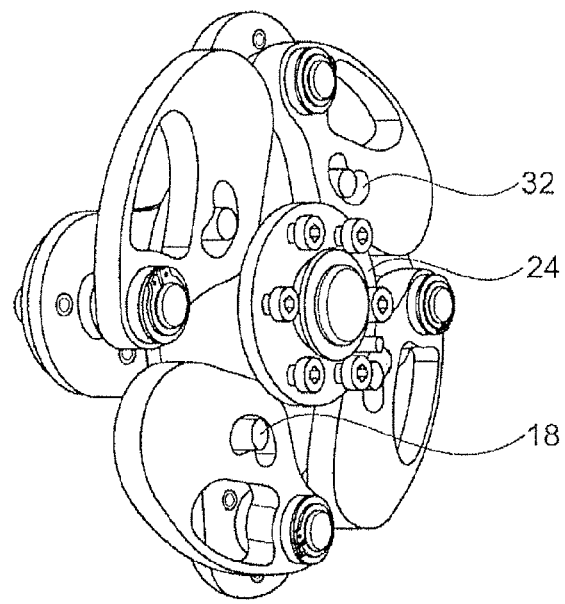
FIG. 2 shows the centrifugal pendulum from FIG. 1 without the cover of the synchronizing ring and with a smaller second disk.

FIG. 1 and FIG. 2 show a first embodiment of a centrifugal pendulum 10 which can be used as a torsional vibration absorber in the drive train of a motor vehicle with an internal combustion engine. The essential components of the centrifugal pendulum 10 are a drive ring 12, a synchronizing ring 14, a plurality of pendulum bodies 16 and a plurality of coupling elements, here in the form of bolts 18.

The drive ring 12 is coupled in the drive train to any drive shaft for rotation therewith and can be, for example, the secondary side of a dual mass flywheel or can be coupled to said secondary side for rotation therewith. For the coupling of the drive ring 12 to the drive shaft or to the secondary side of a dual mass flywheel, an elastic element, which is connected in between, can optionally be provided (an elastic coupling).

The synchronizing ring 14 is mounted rotatably on the drive ring 12 or on the drive shaft with a plane bearing or rolling contact bearing. It is essential for the synchronizing ring 14 itself to be freely rotatable relative to the drive ring 12. The axis of rotation of the drive ring 12 and the axis of rotation of the synchronizing ring 14 are coaxial, i.e. identical.

In addition, a plurality of pendulum bodies 16 are mounted rotatably on the drive ring 12 by plane bearings or rolling contact bearings 20. The bearings 20 of the pendulum bodies 16 are arranged eccentrically with respect to the axis of rotation and are arranged on the drive ring 12 in such a manner that the pendulum bodies 16 can rotate in a plane perpendicular to the axis of rotation. In principle, a single pendulum body 16 is also sufficient; however, the starting point below is a plurality of equally distributed pendulum bodies 16, as shown in the exemplary embodiment of FIGS. 1 and 2.

Figure 3:
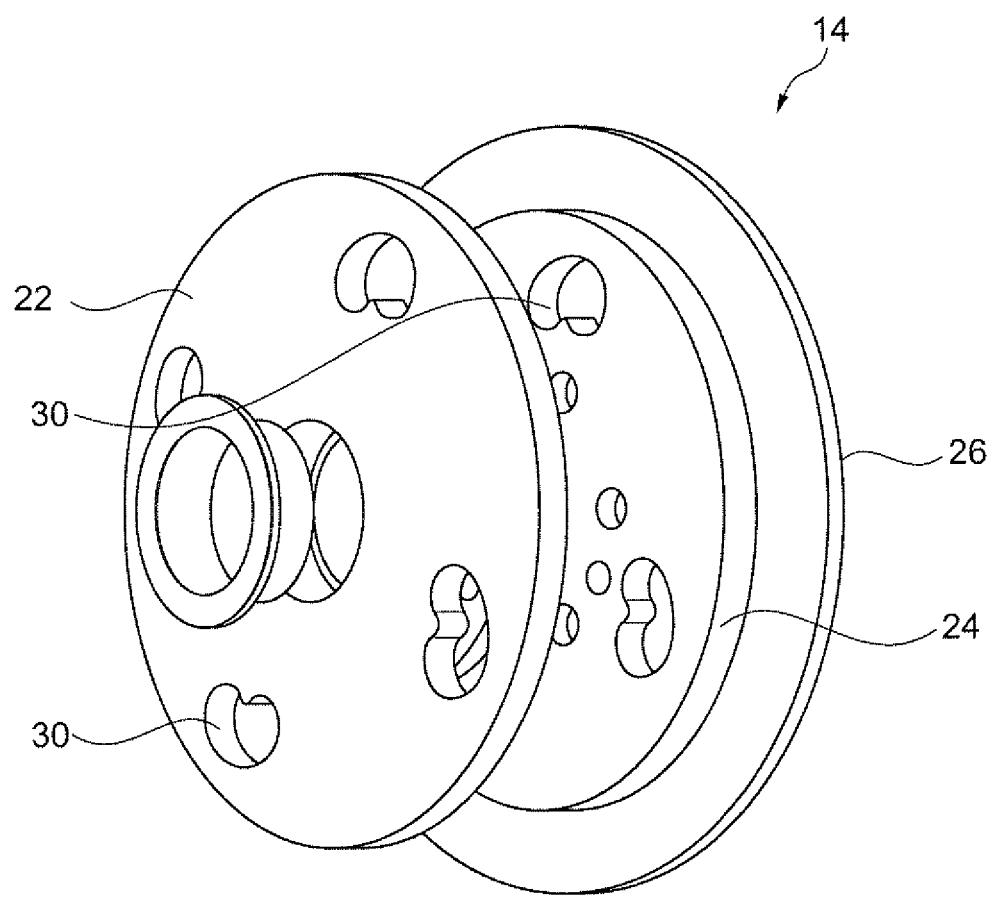
FIG. 3 is a perspective view of a multi-part synchronizing ring.

FIG. 3 separately illustrates the synchronizing ring 14, which is rotatable relative to the drive ring 12. The synchronizing ring 14 is of multi-part design here. A first disk 22 is arranged on that side of the pendulum bodies 16 which faces the drive ring 12, and a second disk 24 is arranged on that side of the pendulum bodies 16 which faces away from the drive ring 12. The two discs 22, 24 are connected rigidly to each other.

Instead of the two discs 22, 24, one thick disk can also be provided, with the intermediate space between the two discs 22, 24 being replaced by one or more grooves into which the pendulum bodies 16 project.

A cover 26 is arranged on that side of the second disk 24 which faces away from the drive ring 12, said cover being fastened to the second disk 24. The cover 26 can also be formed integrally with the second disk 24. A clamping pin 28 ensures an exact, predetermined orientation of the two discs 22, 24 with respect to each other.

A plurality of preferably identical contours 30 are in each case incorporated in the two disks 22, 24 in a manner distributed in the circumferential direction, wherein the contours 30 of the first disk 22 lie exactly opposite the contours 30 of the second disk 24. The contours of the second disk 24 cannot be seen in FIG. 2 since only the inner part of the second disk 24 is illustrated in order to open up the view to the pendulum bodies 16, which are described in more detail below.

Figure 4:
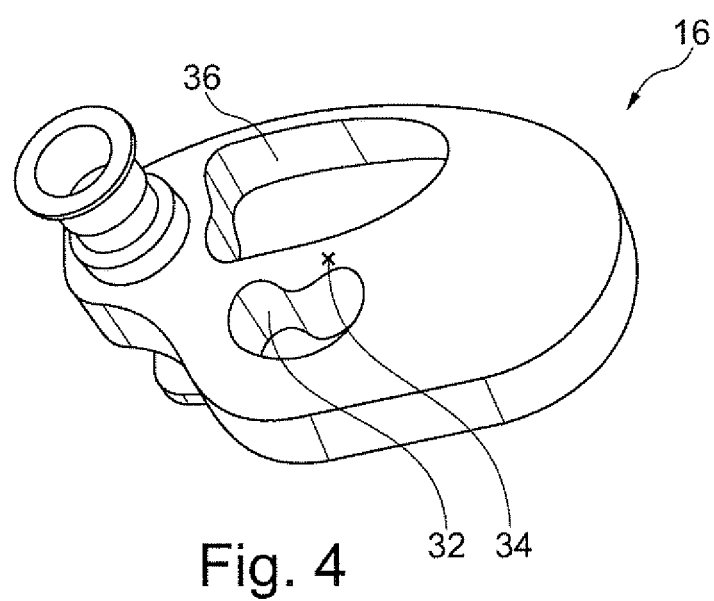
FIG. 4 is a perspective view of a pendulum body.

The preferably identical pendulum bodies 16, of which one is illustrated separately in FIG. 4, are mounted pivotably on the drive ring 12 preferably in each case at the same distance from the axis of rotation. Each pendulum body 16 has a contour 32. The center of mass of the pendulum body 16 is denoted by 34, the position of which is defined by the general shape of the pendulum body 16 and optionally by the formation of a cutout 36 in the pendulum body 16.

The pendulum bodies 16 mounted on the drive ring 12 are coupled to the synchronizing ring 14 by way of the bolts 18. The bolts 18 are placed into the contours 30 and 32; in more precise terms, each bolt 18 extends from a contour 30 of the first disk 22 through the contour 32 of a pendulum body 16 into the opposite contour 30 of the second disk 24. The bolts 18 are neither connected to the synchronizing ring 14 nor to the pendulum bodies 16.

In the axial direction, the bolts 18 are firstly secured by the drive ring 12 which prevents the bolts 18 from falling out of the contours 30 of the first disk 22. The cover 26 is provided so that the bolts 18 cannot fall out of the contours 30 of the second disk 24. Alternatively, however, other coverings could also be provided, or the contours 30 in the discs 22, 24 could only have a certain depth in the axial direction and not be continuous. It is also possible for the bolts 18 to be formed with collars for their axial securing.

The bolts 18 and the contours 30, 32 of the synchronizing ring 14 and of the pendulum bodies 16 are coordinated with one another in such a manner that the pendulum bodies 16 can carry out a limited rotational movement about the bearings 20 thereof with simultaneous rotation of the synchronizing ring 14 relative to the drive ring 12. The bolts 18 here serve as rolling bodies which roll on the contours 30, 32.

In general, the contours 30, 32 and the bolts 18 permit (any) non-linear kinematics between the pendulum bodies 16 and the synchronizing ring 14. A tautochrone design of the centrifugal pendulum 10 can be achieved by the shaping of the contours 30, 32 matched to the bolts 18.

The basic functioning of the centrifugal pendulum 10 is described below.

FIGS. 1 and 2 show a state of the centrifugal pendulum 10, in which torsional forces do not act, and the pendulum bodies 16 are deflected to the maximum. When the engine is started and the drive shaft rotates, the latter carries along the drive ring 12 therewith. The inertia of the freely rotatable synchronizing ring 14 means that the latter first of all follows behind the rotation. The resulting rotation between drive ring 12 and synchronizing ring 14 leads to the bolts 18 rolling on the contours 30, 32 in such a manner that the pendulum bodies 16 are deflected inward; in more precise terms, the overall center of mass of the pendulum bodies 16, which overall center of mass is produced from the position of all of the centers of mass 34 of the individual pendulum bodies 16, migrates in the direction of the axis of rotation.

However, during the further course of the rotation, the centrifugal force pulls the pendulum bodies 16 outward. As a result, the pendulum bodies 16 are deflected outward to such an extent that the bolts 18 rolling in the contours 30, 32 force the synchronizing ring 14 into a rotation relative to the drive ring 12, but in an opposed direction of rotation. This finally leads to the synchronizing ring 14 temporarily overtaking the drive ring 12 after a certain rotation. However, the relative rotation between drive ring 12 and synchronizing ring 14 in the opposed direction of rotation again has the result that the pendulum bodies 16 are deflected inward by the kinematic coupling via the bolts 18.

These operations are repeated, and therefore a pendulum movement of the pendulum bodies 16 occurs. The kinematic relationship between the relative rotation of synchronizing ring 14 and drive ring 12 and the deflection of the pendulum bodies 16 is determined by the masses of the pendulum bodies 16 and the mass inertia of the synchronizing ring 14 and also by the manner of the vibration excitation. The synchronizing ring 14 here provides an additional inert mass, as a result of which the overall inertia is shifted. In addition, the synchronizing ring 14 ensures a synchronous, uniform movement of all of the pendulum bodies 16.

In the event of uniform rotation of the drive shaft, i.e. if a constant torque bears against the drive shaft for a prolonged period, the centrifugal pendulum 10 swings out and a state of equilibrium arises. If, however, as is customary in the case of an internal combustion engine, torque fluctuations occur because of rotational irregularities, the centrifugal pendulum 10 is excited into vibrations. The vibrating masses then effectively ensure that the torsional vibrations in the drive train are damped.

In order to limit the relative rotation between drive ring 12 and synchronizing ring 14, an elastic coupling element can be provided between the two rings. For this purpose, for example, the synchronizing ring 14 is connected to an elastically deformable element directly at the bearing point BP on the drive shaft or the drive ring 12.

The bearings 20 can also have elastic coupling elements which influence the pivoting movements of the pendulum bodies 16 relative to the drive ring 12 in a specific manner. For this purpose, for example, the pendulum body 16 is connected to an elastically deformable element directly at the bearing point BP on the drive ring 12, said element, for its part, being fixedly connected to the drive ring 12.

Furthermore, an additional device with which the synchronizing ring 14 can be actively decelerated or accelerated in the direction of rotation can be provided.

Figure 5:
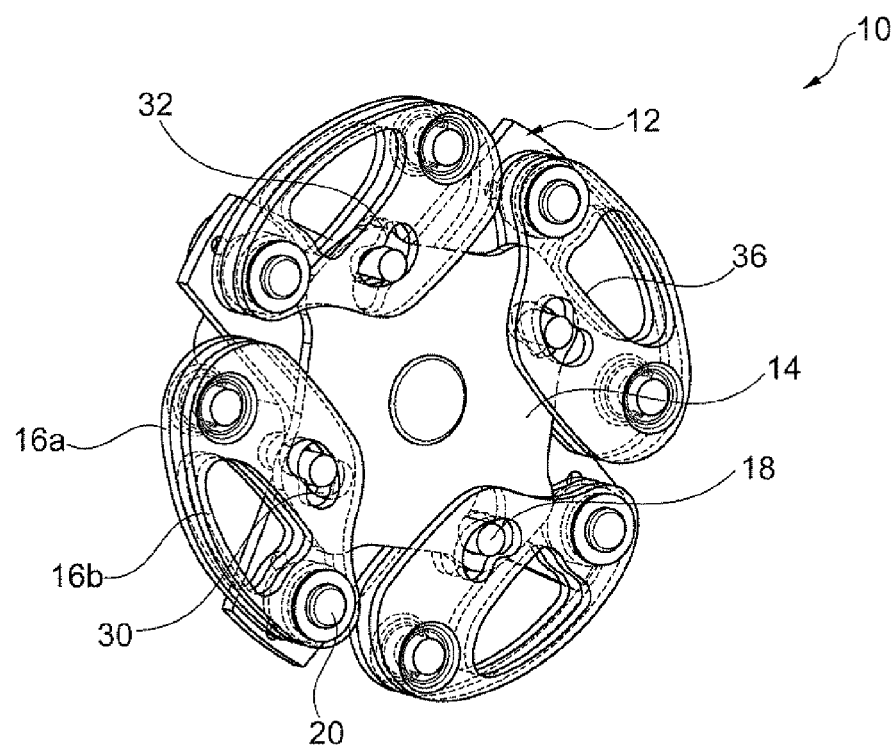
FIG. 5 is a perspective view of a second embodiment of a centrifugal pendulum according to the invention, with pendulum bodies illustrated transparently.

FIG. 5 illustrates a second embodiment of a centrifugal pendulum 10. The substantial difference in relation to the previously described embodiment resides in the differing configuration of the synchronizing ring 14 and of the pendulum bodies 16.

The pendulum bodies 16 here are essentially formed from two halves 16a, 16b with a gap in between. At a suitable point, the pendulum body halves 16a, 16b are rigidly interconnected such that they can rotate together about the bearing 20. Alternatively, the pendulum bodies 16 can also be formed integrally with a groove corresponding to the gap. Each pendulum body half 16a has a contour 32 which lies exactly opposite an identical contour 32 of the other pendulum body half 16b.

The synchronizing ring 14 here is, by contrast, of single-part design in the form of an individual disk. The contours 30 of the synchronizing ring 14 are continuous. The synchronizing ring 14 is arranged in a freely rotatable manner between the pendulum body halves 16a, 16b.

The pendulum bodies 16 are kinematically coupled to the synchronizing ring 14 again by the free bolts 18 which are placed into the contours 30, 32. The bolts 18 extend here from the contours 32 of the one pendulum body half 16a through the contours 30 of the synchronizing ring 14 into the contours 32 of the opposite pendulum body half 16b.

In the axial direction, the bolts 18 are secured on one side by the drive ring 12; on the other side, either coverings can be fitted on the pendulum body halves 16b or the contours 32 only have a certain depth in the pendulum body half 16a and/or 16b in the axial direction and are not continuous.

The functioning of the centrifugal pendulum 10 corresponds to that of the first embodiment, i.e. the synchronizing ring 14 ensures a synchronous swinging of the pendulum bodies 16 in pendulum fashion in the form of torsional vibrations around the bearings 20.

FIGS. 6 to 9 schematically illustrate four further embodiments of the centrifugal pendulum 10, in which the pendulum bodies 16 are not mounted rotatably, but rather in a radially displaceable manner in corresponding guides 38 of the drive ring 12. Here too, the following is also based on a plurality of pendulum bodies 16 although it is also possible to provide only one individual pendulum body 16.

Figures 6, 7:
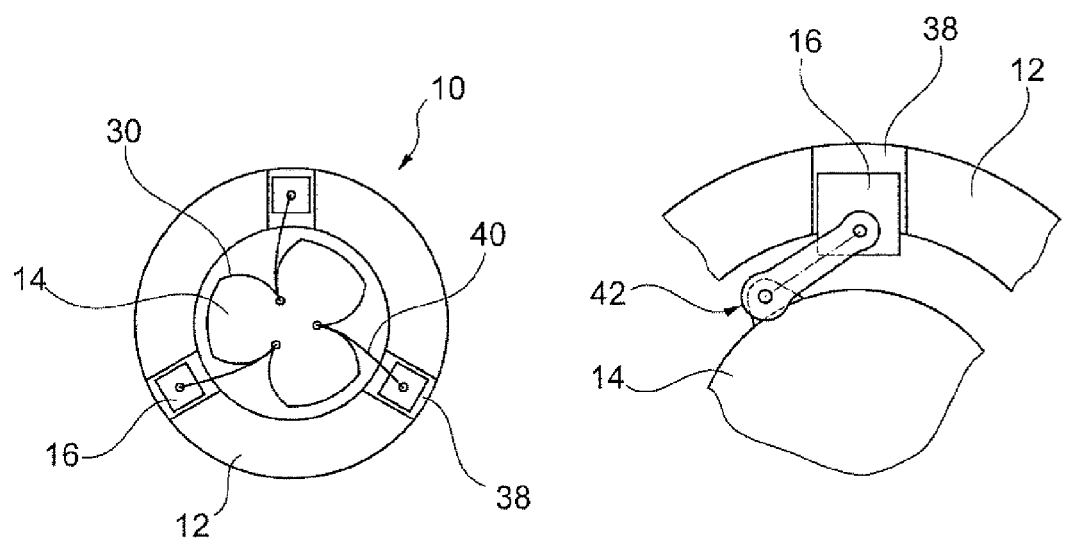
FIG. 6 is a schematic top view of a third embodiment of a centrifugal pendulum according to the invention.
FIG. 7 is a schematic top view of a detail of a fourth embodiment of a centrifugal pendulum according to the invention.

In the embodiment shown in FIG. 6, the pendulum bodies 16 are connected to the synchronizing ring 14 via threads or bands 40. The synchronizing ring 14 itself has an outer circumference with special contours 30 for the threads or bands 40 which here, instead of the bolts 18, ensure the kinematic coupling of the pendulum bodies 16 to the synchronizing ring 14. The kinematic coupling can be adapted to certain requirements by means of the configuration of the contours 30.

In a similar manner as in the previously described embodiments, a rotation of the synchronizing ring 14 relative to the drive ring 12 brings about a shifting of the pendulum bodies 16 in the guides 38 toward the axis of rotation, since the threads or bands 40 nestle against the contours 30 and, by means of the deflection of said threads or bands in the direction of rotation, pull the pendulum bodies 16 or the overall center of mass of the pendulum bodies 16 inward. The shifting of the pendulum bodies 16 is translatory here because of the linearly designed guides 38. The centrifugal force in turn ensures that the pendulum bodies 16 are pulled outward, and therefore the direction of rotation of the synchronizing ring 14 relative to the drive ring 12 is reversed. The repetition of these operations leads to the centrifugal pendulum 10 swinging.

The embodiment of the centrifugal pendulum 10 that is shown in FIG. 7 is very similar to the embodiment of FIG. 6. Instead of the threads or bands 40, an articulation mechanism 42 in each case ensures the kinematic coupling here. A special contour on the synchronizing ring 14 is not provided since the previously precisely defined configuration of the articulation mechanism 42 is decisively responsible here for the vibration behavior.

Figure 8:
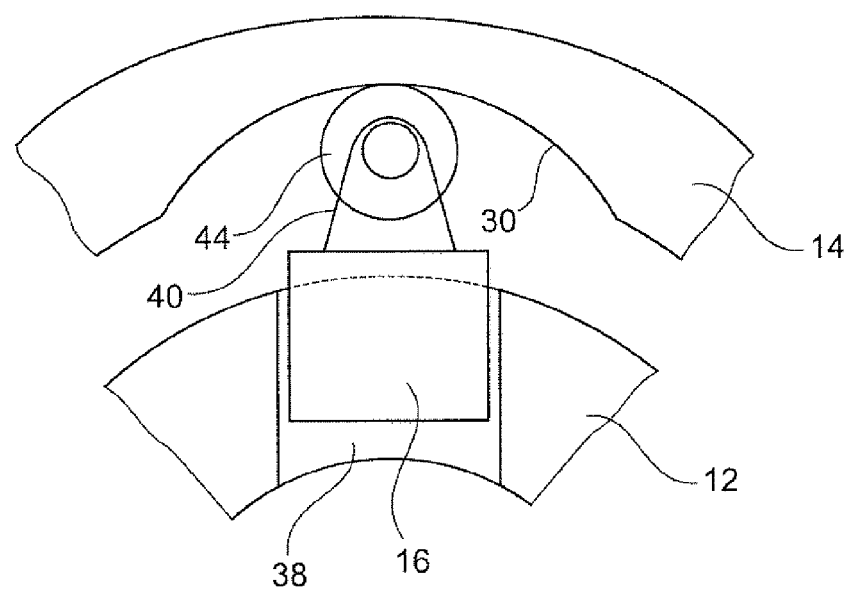
FIG. 8 is a schematic top view of a detail of a fifth embodiment of a centrifugal pendulum according to the invention.

Also in the embodiment shown in FIG. 8, pendulum bodies 16 are mounted in a radially displaceable manner in corresponding guides 38 of the drive ring 12. The pendulum bodies 16 here are coupled to an outer section of the synchronizing ring 14 by the pendulum bodies 16 each being hooked by a thread or band 40 into a roller 44 which can roll on an inside contour 30 of the outer section of the synchronizing ring 14.

Figure 9:
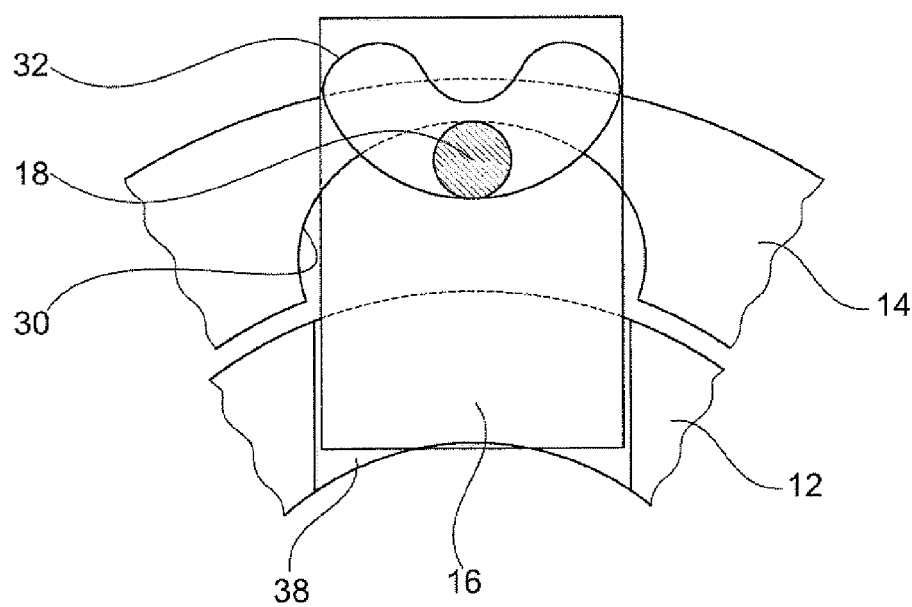
FIG. 9 is a schematic top view of a detail of a sixth embodiment of a centrifugal pendulum according to the invention.

The embodiment shown in FIG. 9 differs from that previously described in that a bolt 18 is provided instead of the roller 44 and, instead of the thread or band 40, contours 32 are provided in the pendulum body 16. The pendulum body 16 here has the shape of a "U" and by the two limbs thereof engages around the outer section of the synchronizing ring 14. The two limbs each have contours 32 lying exactly opposite each other. The bolt extends from the one contour 32 to the opposite contour 32 and, in the process, touches the contour 30 of the synchronizing ring 14. The contours 30, 32 are coordinated with each other in such a manner that, during a relative rotation between drive ring 12 and synchronizing ring 14, the pendulum bodies 16 and the overall center of mass thereof are pressed inward and that, in the event of a centrifugally induced movement of the pendulum bodies 16 outward, the direction of rotation of the synchronizing ring 14 relative to the drive ring 12 is reversed.

A common feature of all of the described embodiments is that the pendulum bodies 16 are kinematically coupled to the synchronizing ring 14, and therefore a uniform, synchronous deflection of all of the pendulum bodies 16 is always ensured. In principle, embodiments with just one pendulum body 16 are also possible as long as the latter is kinematically coupled to the synchronizing ring 14.

The kinematic coupling can also be realized by combinations of different concepts. The translatory guide of the pendulum bodies 16 can be converted by the options known in the art into the linear guide (for example dovetail guide, wedge guide, etc.). The pendulum bodies 16 are preferably of cylindrical design and are guided in a cylinder matched thereto (in a similar manner as the pistons in an internal combustion engine). In addition, for the mounting on the drive ring 12, the pendulum bodies 16 can be coupled to an elastically deformable element which, for its part, is coupled fixedly to the drive ring 12.

As is apparent from the drawings, the selected descriptions of the components of the centrifugal pendulum 10 should not be understood as being limiting. In particular, the drive ring 12 and the synchronizing ring 14 do not have to have the classical shape of a ring, but can in each case have a configuration differing therefrom.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A centrifugal pendulum, comprising:
a drive ring;
a synchronizing ring; and
a plurality of pendulum bodies that are mounted on the drive ring, wherein
each pendulum body: i) at an edge thereof, defines an opening into which a bearing is inserted, ii) has an elongated wedge shape that defines therein a wedge-shaped cutout portion, iii) defines a pendulum contour within which a coupling body that couples each pendulum body to the synchronizing ring is free to move, and iv) has a center of mass that is located between the wedge-shaped cutout portion and the pendulum contour.

2. The centrifugal pendulum according to claim 1, wherein the centrifugal pendulum is configured for arrangement on a drive shaft of an internal combustion engine.

3. The centrifugal pendulum according to claim 1, wherein an axis of rotation of the drive ring and an axis of rotation of the synchronizing ring are identical.

4. The centrifugal pendulum according to claim 1, wherein the plurality of pendulum bodies are mounted rotatably on the drive ring, and the coupling body permits only a limited rotation of each pendulum body.

5. The centrifugal pendulum according to claim 1, wherein:
the plurality of pendulum bodies lie between two rigidly interconnected discs of the synchronizing ring; and
the coupling body extends from a first contour on a first one of the two disks through the pendulum contour into a second contour of a second one of the two disks, said second contour lying exactly opposite to the first contour.

6. The centrifugal pendulum according to claim 1, wherein:
the synchronizing ring projects between two rigidly interconnected halves of the plurality of pendulum bodies; and
the coupling body extends from a first contour of a first pendulum body half through a contour of the synchronizing ring into a second contour of a second pendulum body half, said second contour lying exactly opposite to the first contour.

7. The centrifugal pendulum according to claim 1, wherein the plurality of pendulum bodies are mounted on the drive ring so as to be displaceable in a translatory manner.

8. The centrifugal pendulum according to claim 7, wherein the translatory displacement is in a radial direction.

9. The centrifugal pendulum according to claim 1, wherein:
the coupling element is a thread or a band with which the plurality of pendulum bodies are connected to the synchronizing ring, and
the synchronizing ring has an outer circumference with a contour against which the thread or the band nestles during a rotation between drive ring and synchronizing ring.

10. The centrifugal pendulum according to claim 1, wherein the coupling element is an articulation mechanism via which the pendulum bodies are connected to the synchronizing ring.

11. The centrifugal pendulum according to claim 1, wherein the coupling element is a bolt.

12. The centrifugal pendulum according to claim 1, wherein the plurality of pendulum bodies are coupled to an outer section of the synchronizing ring by being hooked into a roller which can roll on a contour of the synchronizing ring.

* * * * *